(12) United States Patent
Kiel et al.

(10) Patent No.: US 7,545,984 B1
(45) Date of Patent: Jun. 9, 2009

(54) QUANTIFYING GRAPHICS IMAGE DIFFERENCE

(75) Inventors: Jeffrey T. Kiel, Raleigh, NC (US);
Eldon S. Larsen, Carrboro, NC (US)

(73) Assignee: Nvidia Corporation, Santa Clara, CA (US)

( * ) Notice: Subject to any disclaimer, the term of this patent is extended or adjusted under 35 U.S.C. 154(b) by 865 days.

(21) Appl. No.: 11/015,598

(22) Filed: Dec. 16, 2004

(51) Int. Cl.
*G06K 9/68* (2006.01)
(52) U.S. Cl. ........................ 382/220; 345/619; 382/221; 382/274
(58) Field of Classification Search ................. 382/220, 382/221, 274; 345/619
See application file for complete search history.

(56) References Cited

U.S. PATENT DOCUMENTS

| | | | |
|---|---|---|---|
| 5,091,780 A * | 2/1992 | Pomerleau | 348/152 |
| 6,927,874 B1 * | 8/2005 | Enokida et al. | 358/1.18 |
| 7,343,047 B2 * | 3/2008 | Aas et al. | 382/255 |
| 2005/0157916 A1 * | 7/2005 | Sato | 382/130 |
| 2006/0110044 A1 * | 5/2006 | Reissman | 382/203 |

* cited by examiner

*Primary Examiner*—Gregory M Desire
(74) *Attorney, Agent, or Firm*—Townsend and Townsend and Crew LLP

(57) ABSTRACT

Methods, apparatuses, and systems are presented for measuring difference between graphics images relating to performing an arithmetic operation involving a first graphics image comprising a plurality of first pixels and a second graphics image comprising a plurality of second pixels to produce a difference image comprising a plurality of difference pixels, generating measures of proximity from a plurality of ranges of observation within the difference image, wherein the measures of proximity represent spatial proximity of difference pixels to other difference pixels within the difference image, and applying non-uniform weighting to the difference pixels to produce a weighted difference image, wherein the non-uniform weighting depends on the measures of proximity generated from the plurality of ranges of observation.

22 Claims, 11 Drawing Sheets

QUANTIFYING GRAPHICS IMAGE DIFFERENCE

CROSS-REFERENCES TO RELATED APPLICATIONS

This application is related to U.S. patent application Ser. No. 10/936,150, filed Sep. 7, 2004, entitled "Fourier Transform Optimized Anisotropic Filtering," the entire disclosure of which is hereby incorporated by reference for all purposes.

BACKGROUND OF THE INVENTION

There exists a wide range of applications requiring the computation of differences between images. For example, differential image encoding algorithms may involve representation of a particular image in a series of images as simply the difference between the image and a preceding image. As another example, certain image processing techniques may incorporate computation of differences between pre-process and post-process images to the quantify the effects of a particular image processing procedure. These are just two simple examples. There may be many other present and future applications for the computation of image differences.

FIG. 1 is a block diagram of an illustrative computer system 100 in which computation of image differences may be performed. Computation of image differences may be applicable to different types of computer systems. FIG. 1 provides one example of such a system. As shown, computer system 100 includes a graphics card 102, a central processing unit (CPU) 104, a chipset comprising a northbridge chip 106 and a southbridge chip 108, system memory 110, peripheral component interconnect (PCI) slots 112, a disk drive controller 114, universal serial bus (USB) connectors 116, audio CODEC 118, a super I/O controller 120, and a keyboard controller 122. As shown in FIG. 1, graphics card 102 includes a graphics processing unit (GPU) 124 and local memory 126. Also, graphics card 102 is connected to a display 128 that may be part of computer system 100. Here, GPU 124 is a semiconductor chip designed to perform graphics processing operations associated with rendering an image that may be presented on display 128. While not explicitly shown in FIG. 1, computer system 100 may comprise more than one graphics card 102, and each graphics card 102 may comprise more than one GPU 124.

Computation of differences between images may involve various components in computer system 100. For example, computation of the difference between a first image and a second image may be performed by a processing unit such as CPU 104, GPU 124, or other equipment capable of processing tasks. The first image and second image may be stored in one or more storage units such as system memory 110 and memory 126. For instance, difference computation may be performed during execution of a software program involving image processing techniques. Such a software program may represent a video game, an image processing tool, a video recorder/player, a developer tool for adjusting components such as graphics card 102 and/or GPU 124, and others.

A significant challenge in computing image differences relates to the fact that often, the computation must take into account differences between images as perceived by the human eye. In other words, the simplistic pixel-by-pixel mathematical difference between two images may not be adequate. For example, the simple mathematical difference between two images may be expressed as:

$$\text{Diff Image} = (\text{Image 1}) - (\text{Image 2}) \quad\quad (\text{Eq. 1})$$

where Image 1 and Image 2 each represents a two-dimensional array of pixel values, and Diff Image also represents a two-dimensional array of pixel values. Each pixel of Diff Image may be obtained by subtracting a corresponding pixel in Image 1 by a corresponding pixel in Image 2. Here, each pixel value may represent a brightness value for a black and white image, a particular channel for a color image, or some other value. For example, the channel may represent a brightness channel, a chroma channel, a particular channel in an RGB (red, green, blue) scheme such as a red channel, a green channel, a blue channel, etc. As presented in the equation above, this particular difference image only represents a simple subtraction of Image 1 and Image 2. Such a difference image, while easily calculated, may not adequately represent the difference between Image 1 and Image 2 as perceived by human vision.

Various techniques have been developed in the attempt to present more useful measures of the difference between two images. One such technique involves squaring the arithmetic difference between the images:

$$\text{Diff Image} = ((\text{Image 1}) - (\text{Image 2}))^2 \quad\quad (\text{Eq. 2})$$

The effect of this squaring step is that differences of greater magnitude are amplified more than differences of lesser magnitude. Consequently, larger differences are accentuated. Other variations for computing difference between images also exist.

However, these and other traditional techniques for computing image differences fail to take into account perceptual effects that may be related to locality of image differences to other image differences, as well as locality of image difference to edges. That is, human visual perception is more sensitive to image differences when those image differences are located closer to other image differences. Also, human visual perception is more sensitive to image differences when those image differences are located closer to edges—such as areas characterized by polygon edges or texture changes—as opposed areas with little or no changes. By ignoring effects of locality of image differences to other image differences and locality of image differences to edges, traditional image difference techniques fail to exploit significant characteristics of human visual perception. The many present and future applications in which computation of image differences is required may all benefit tremendously from fundamental improvements in the computation of image differences that take into account such characteristics of human visual perception. Thus, there exists a significant need for improved techniques in image difference computation that to take into account locality of image differences to other image differences and/or locality of image differences to edges.

BRIEF SUMMARY OF THE INVENTION

The present invention relates to methods, apparatuses, and systems for measuring difference between graphics images relating to performing an arithmetic operation involving a first graphics image comprising a plurality of first pixels and a second graphics image comprising a plurality of second pixels to produce a difference image comprising a plurality of difference pixels, generating measures of proximity from a plurality of ranges of observation within the difference image, wherein the measures of proximity represent spatial proximity of difference pixels to other difference pixels within the difference image, and applying non-uniform weighting to the difference pixels to produce a weighted difference image, wherein the non-uniform weighting depends on the measures of proximity generated from the plurality of ranges of observation. The measures of proximity may be generated from the plurality of ranges of observation by generating an initial proximity matrix, each element of the initial proximity matrix corresponding to a group of adjacent difference pixels in the difference image and representing a count of non-zero difference pixels within the group of adjacent difference pixels, and generating a new proximity matrix, each element of the new proximity matrix corresponding to a group of adjacent elements in a previously generated proximity matrix and representing a count of non-zero elements within the group of adjacent elements in the previously generated proximity matrix.

In one embodiment of the invention, the group of adjacent difference pixels consists of four difference pixels in the difference image, and the group of adjacent elements consists of four elements in the prior proximity matrix. The difference image may be an N by N image, the initial proximity matrix may be an N/2 by N/2 matrix, and the new proximity matrix may be smaller than the prior proximity matrix by a factor of two in each dimension, wherein N is a positive integer.

Application of non-uniform weighting to at least one difference pixel may involve multiplying measures of proximity generated from different ranges of observation that include the at least one difference pixel.

Edge information may also be obtained relating to at least one of the first and second graphics images, and the edge information may be applied to the difference pixels to produce an edge-enhanced difference image. The edge information may comprise at least one broadened edge line generated from a narrower edge line.

A scaled version of the difference image, a scaled version of the weighted difference image, and a scaled version of the edge-enhanced difference image may be combined to produce a composite difference image.

According to one embodiment of the invention, the composite difference image may be used in selecting an appropriate level of anisotropic filtering. The first graphic image may result from applying a lower level of anisotropic filtering, the second graphic image may result from applying a higher level of anisotropic filtering, and the composite difference image may be used to determine whether the higher level of anisotropic filtering produces sufficient improvements over the lower level of anisotropic filtering.

According to another embodiment of the invention, the appropriate level of anisotropic filtering may be selected for a test image, and the test image may be used to tune a Fourier-transform-based process for selecting an appropriate level of anisotropic filtering.

DETAILED DESCRIPTION OF THE INVENTION

Proximity Measures

Figure 1:
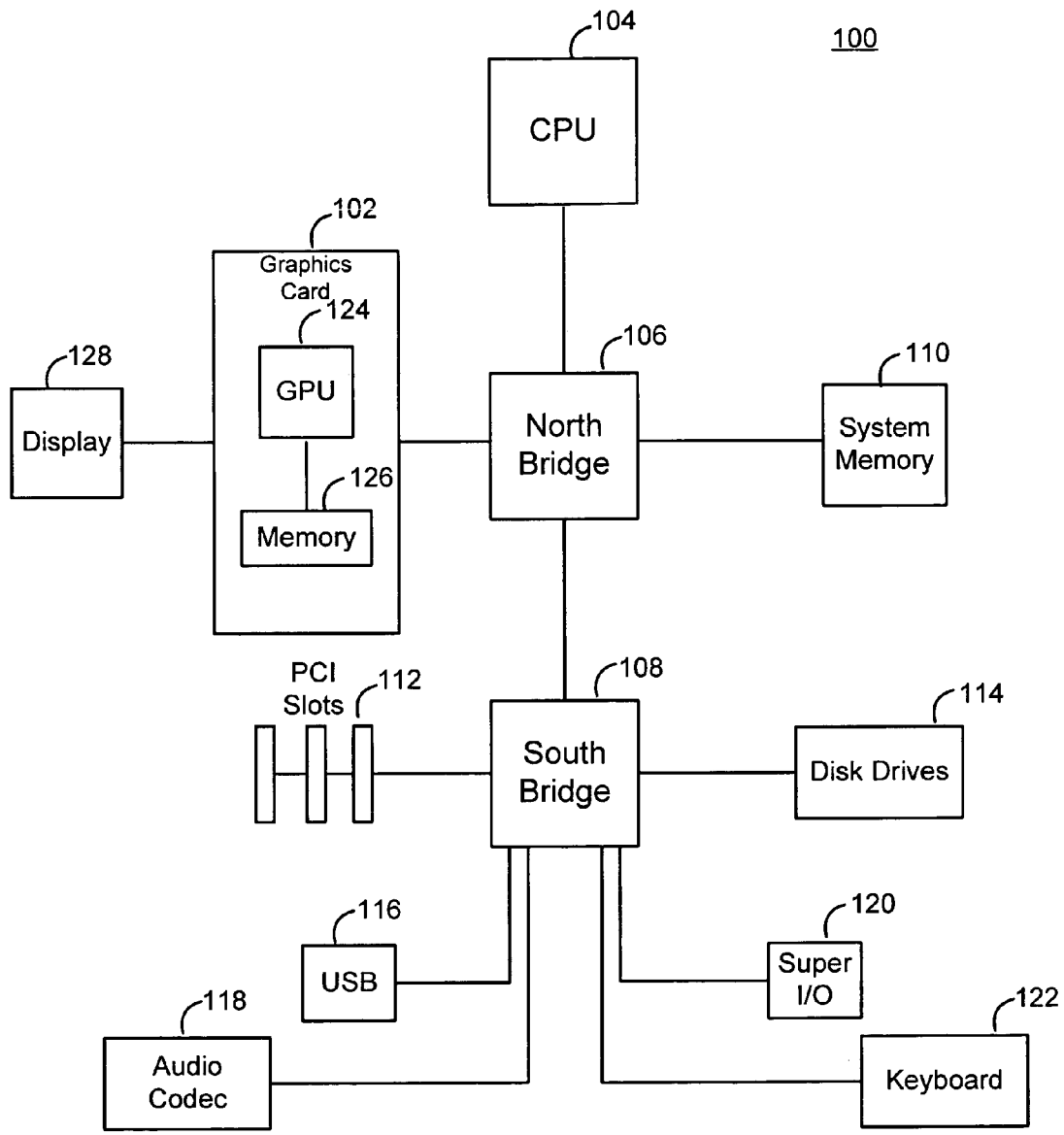
FIG. 1 is a block diagram of an illustrative computer system in which computation of image differences may be performed.
Figure 2:
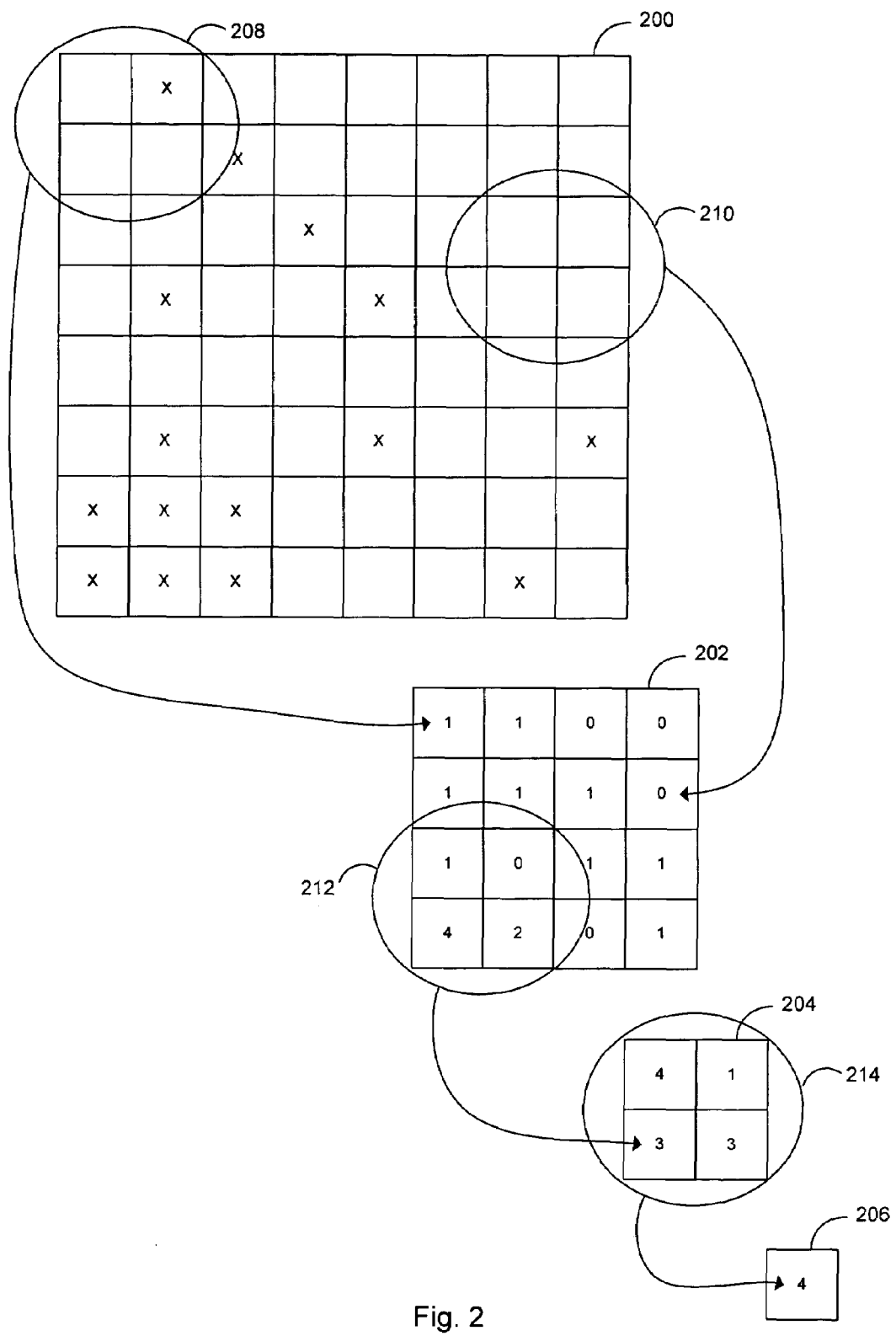
FIG. 2 presents a technique for obtaining measures of proximity of difference pixels to other difference pixels from a plurality of ranges of observation within a difference image, in accordance with one embodiment of the present invention.

FIG. 2 presents a technique for obtaining measures of proximity of difference pixels to other difference pixels from a plurality of ranges of observation within a difference image, in accordance with one embodiment of the present invention. A difference image 200 is shown. Here, difference image 200 is a two-dimensional difference image that is produced by performing a subtraction operation involving a first image and a second image. For example, computation of the difference between the first image and the second image may be performed by a processing unit such as CPU 104, GPU 124, or other equipment capable of processing tasks. The first image and second image may be stored in one or more storage units such as system memory 110 and memory 126. While not explicitly shown in FIG. 1, computer system 100 may comprise more than one graphics card 102, and each graphics card 102 may comprise more than one GPU 124.

Referring back to FIG. 2, the first image, the second image, and difference image 200 in this simple example are all two-dimensional images that measure eight pixels by eight pixels. These dimensions are chosen for purposes of illustration, and the invention is not limited to these particular dimensions. Each pixel in the first image may represent a brightness value for a black and white image, a particular channel for a color image, or some other value, as previous mentioned. Similarly, each pixel in the second image may correspond to a particular type of pixel value. The subtraction operation may be the simple mathematical difference mentioned previously between the first image and the second image, expressed as:

$$\text{Diff Image} = (\text{Image 1}) - (\text{Image 2}) \qquad \text{(Eq. 3)}$$

Difference image 200 may be generated in other ways. For example, the absolute value of the difference between the first image and the second image may be obtained. Also, one or more of the first image and second image may be square, cubed, etc. The difference value may be squared, cubed, etc. However difference image 200 is obtained, it is some form of representation of differences between the first image and second image. According to various embodiments of the present invention, difference image 200 may be processed such that locality of image pixels to other image pixels may be taken into account. Alternatively or in addition, locality of image pixels to edges may be taken into account.

As can be seen in FIG. 2, difference image 200 comprises sixty-four individual difference pixels. Some of the difference pixels have values of zero, and these pixels are represented in difference image 200 by empty cells. Others of the difference pixels have non-zero values, and these pixels are represented in difference image 200 by cells marked with a symbol "x." For ease of illustration, the actual value of each non-zero difference pixel is not explicitly show in FIG. 2. It should be understood that each symbol "x" represents a particular non-zero value of a difference pixel.

According to the present embodiment of the invention, measures of the spatial proximity of difference pixels to other difference pixels within difference image 200 may be obtained by counting the number of non-zero difference pixels within various ranges of observation defined in difference image 200. In the present embodiment, these counts are organized into matrices referred to here as proximity matrices. Examples of such matrices are shown in FIG. 2 as proximity matrices 202, 204, and 206.

As shown in FIG. 2, proximity matrix 202 has sixteen elements and is generated by partitioning difference image 200 into sixteen equally-sized, non-overlapping blocks. Each of these sixteen blocks contains four difference pixels from difference image 200. For each block, a count is taken of how many of the four difference pixels in the block are non-zero difference pixels. The possible values of each count thus range from 0 to 4. In this manner, sixteen counts are generated, one for each of the sixteen blocks of difference image 200. The sixteen counts are stored as the sixteen elements that make up proximity matrix 202. For example, one of these sixteen blocks is shown in the figure as block 208. Block 208 contains four difference pixels. However, only one out of these four difference pixels has a non-zero value. Thus, a count of "1" corresponding to block 208 is generated and stored as one of the elements of proximity matrix 202. As another example, block 210 is another one of the sixteen blocks. Block 210 contains four difference pixels. Here, none out of the four difference pixels in block 210 has a non-zero value. Thus, a count of "0" corresponding to block 210 is generated and stored as another one of the elements of proximity matrix 202. As shown in the figure, each block represents a group of adjacent difference pixels in difference image 200. While the blocks of image 200 described in this specific embodiment of the invention are equally-sized and non-overlapping, the invention is not so limited.

Proximity matrix 204 is generated from proximity matrix 202, in similar fashion as the generation of proximity matrix 202 from difference image 200. Specifically, proximity matrix 204 has four elements and is generated by partitioning proximity matrix 202 into four equally-sized, non-overlapping blocks. Each of these four blocks contains four elements from proximity matrix 202. For each block, a count is taken of how many of the four elements in the block are non-zero elements, that is, elements having a non-zero value. Again, the possible values of each count range from 0 to 4. Thus, four counts are generated, one for each of the four elements that make up proximity matrix 204. For example, one of these four blocks is shown in the figure as block 212. Block 212 contains four elements of proximity matrix 202. Here, three of the four elements in block 212 have non-zero values. Thus, a count of "3" is generated and stored as one of the elements of proximity matrix 204. As shown in the figure, each block represents a group of adjacent elements in proximity matrix 202. While the blocks of proximity matrix 202 described in this specific embodiment of the invention are equally-sized and non-overlapping, the invention is not so limited.

Proximity matrix 206 is generated from proximity matrix 204 in a similar fashion. Here, proximity matrix 206 has only one element, so it is generated by treating proximity matrix 204 as one block 214. Block 214 contains four elements from proximity matrix 204. A count is taken of how many of the four elements in the block are non-zero elements. Once again, the possible values of the count range from 0 to 4. As shown in the figure, all four elements in block 214 are non-zero elements. Thus, a count of "4" is generated and stored as the single element of proximity matrix 206. As shown in the figure, each block represents a group of adjacent elements in proximity matrix 204. The block of proximity matrix 204 described in this specific embodiment of the invention is a single block.

Proximity matrices 202, 204, and 206 are thus sequentially generated according to the present embodiment of the invention. That is, an initial proximity matrix 202 is first generated from difference image 200. Then, new proximity matrix 204 is generated from the previously generated proximity matrix 202. Then, new proximity matrix 206 is generated from the previously generated proximity matrix 204. The elements of proximity matrices 202, 204, and 206 are counts that represent measures of spatial proximity of difference pixels to other difference pixels within difference image 200.

Figure 3:
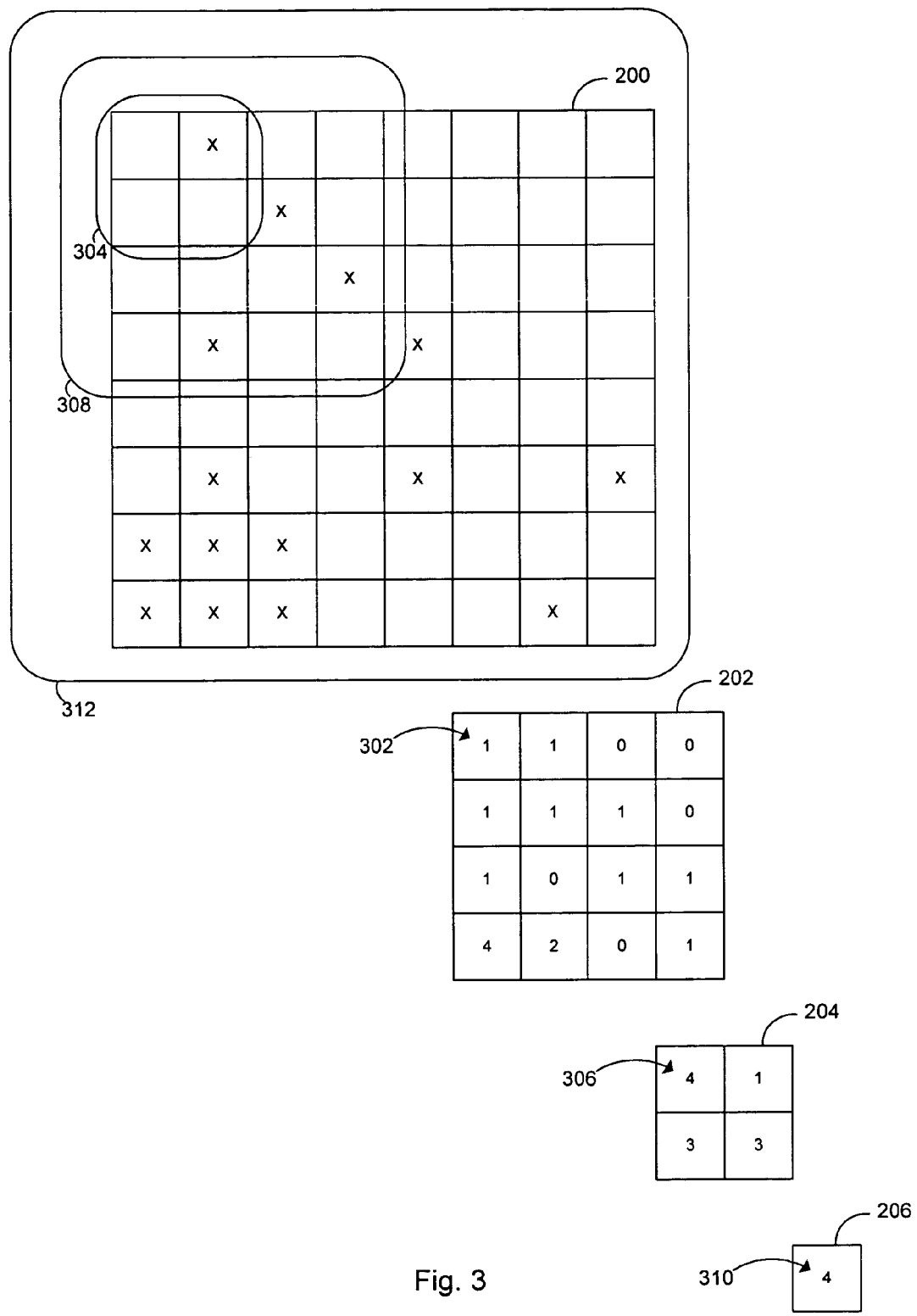
FIG. 3 illustrates how the generated measures of proximity shown in FIG. 2 relate to different ranges of observation within the difference image.

FIG. 3 illustrates how the generated measures of proximity shown in FIG. 2 relate to different ranges of observation within difference image 200. FIG. 3 shows the same priority matrices 202, 204, and 206 previously shown in FIG. 2. Each element of each of the priority matrices 202, 204, and 206 is a count that represents a measure of proximity and corresponds to a particular range of observation within difference image 200. For example, element 302 in proximity matrix 202 corresponds to a range of observation 304. Range of observation 304 can be conceptualized as having four equally-sized quadrants. Range of observation 304 has dimensions of two pixels by two pixels, for a total of area of four pixels. Thus, range of observation 304 is a four-pixel range of observation, and each of its four quadrants covers one pixel. Element 302 may be viewed as a count of how many quadrants, out of these four quadrants, contain any non-zero difference pixels. As seen in FIG. 3, of the four quadrants in range of observation 304, only one quadrant contains any non-zero difference pixels. Accordingly, element 302 has a value of "1." The rest of proximity matrix 202 may be interpreted the same way. That is, each of the other fifteen elements in proximity matrix 202 corresponds to a different four-pixel range of observation in difference image 200 and may be viewed as a count of how many quadrants, out of four quadrants of the corresponding range of observation, contain non-zero difference pixels.

Element 306 in proximity matrix 204 corresponds to a range of observation 308. Range of observation 308 can be conceptualized as having four equally-sized quadrants. Range of observation 308 has dimensions of four pixels by four pixels, for a total of area of sixteen pixels. Thus, range of observation 306 is a sixteen-pixel range of observation, and each of its four quadrants covers four pixels. One of the four quadrants of range of observation 308 is actually the previously described range of observation 304. Element 306 may be viewed as a count of how many quadrants, out of the four quadrants of range of observation 308, contain any non-zero difference pixels. As seen in FIG. 3, of the four quadrants in range of observation 308, all four quadrants contain non-zero difference pixels. Accordingly, element 306 has a value of "4." The rest of proximity matrix 204 may be interpreted the same way. That is, each of the other three elements in proximity matrix 204 corresponds to a different sixteen-pixel range of observation in difference image 200 and may be viewed as a count of how many quadrants, out of four quadrants of the corresponding range of observation, contain non-zero difference pixels.

Element 310 in proximity matrix 206 corresponds to a range of observation 312. Range of observation 310 can be conceptualized as having four equally-sized quadrants. Range of observation 310 has dimensions of eight pixels by eight pixels, for a total of area of sixty-four pixels. Thus, range of observation 312 is a sixty-four-pixel range of observation, and each of its four quadrants covers sixteen pixels. One of the four quadrants of range of observation 312 is actually the previously described range of observation 308. Element 310 may be viewed as a count of how many quadrants, out of the four quadrants of range of observation 312, contain any non-zero difference pixels. As seen in FIG. 3, of the four quadrants in range of observation 312, all four quadrants contain non-zero difference pixels. Accordingly, element 310 has a value of "4."

As shown in FIG. 2, proximity matrices 202, 204, and 206 may be generated sequentially according to one embodiment of the present invention. That is, an initial proximity matrix 202 is first generated from difference image 200. Then, new proximity matrix 204 is generated from the previously generated proximity matrix 202. Then, new proximity matrix 206 is generated from the previously generated proximity matrix 204. In an alternative embodiment of the invention, proximity matrices 202, 204, and 206 may be independently generated from difference image 200, instead of being generated in a sequential manner. For example, element 302 in proximity matrix 202 may be obtained by evaluating the corresponding range of observation 304 and determining how many of the four quadrants of range of observation 304 include any non-zero-pixels. The rest of proximity matrix 202 may be obtained in a similar manner. Independently, element 306 in proximity matrix 204 may be obtained by evaluating the corresponding range of observation 308 and determining how many of the four quadrants of range of observation 308 include any non-zero pixels. The rest of proximity matrix 204 may be obtained in a similar manner. Independently, element 310 in proximity matrix 206 may be obtained by evaluating the corresponding range of observation 312 and determining how many of the four quadrants of range of observation 312 include any non-zero pixels.

Weighted Difference Image

Figure 4:
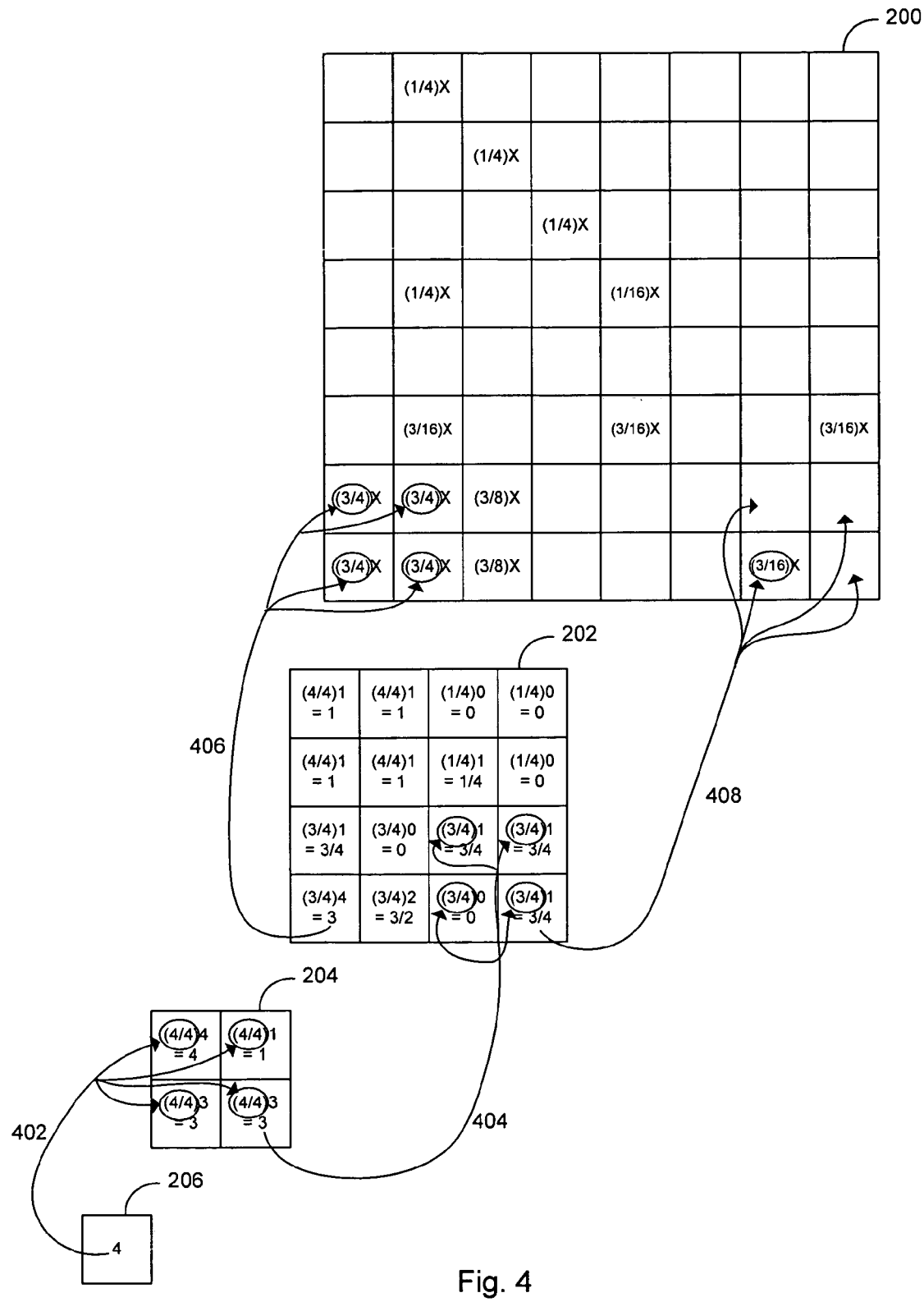
FIG. 4 presents a technique for using measures of proximity of difference pixels to other difference pixels within a difference image to apply non-uniform weighting to the difference image, in accordance with one embodiment of the present invention.

FIG. 4 presents a technique for using measures of proximity of difference pixels to other difference pixels within a difference image, to apply non-uniform weighting to the difference image, in accordance with one embodiment of the present invention. As shown in FIG. 4, a weighted difference image 400 may be generated by applying non-uniform weighting to the difference image 200 shown in FIG. 2. Each non-zero difference pixel in weighted image 400 may be weighted by a scalar, expressed as a fractional value in FIG. 4. According to the present embodiment of the invention, the scalars found in weighted difference image 400 are generated by incorporating proximity measures from proximity matrices 202, 204, and 206. In the present embodiment of the invention, this process may involve successively updating proximity matrices 202, 204, and 206.

First, proximity matrix 206 is used to update proximity matrix 204. Specifically, each element of proximity matrix 206 corresponds to a particular block of elements in proximity matrix 204 and is used to update that block of elements. In this case, the single element of proximity matrix 206 is used to update the block that is the entire proximity matrix 204. In a step 402, the single element in proximity matrix 206 (having a value of "4") is normalized by dividing it by the its maximum value of ("4"), and the resulting fractional value ("4/4") is multiplied to each element of the corresponding block of proximity matrix 204.

Next, proximity matrix 204 is used to update proximity matrix 202. Specifically, each element of proximity matrix 204 corresponds to a particular block of elements in proximity matrix 202 and is used to update that block of elements. For example, in a step 404, an element in proximity matrix 206 (having a value of "3") is normalized by dividing it by the its maximum value of ("4"), and the resulting fractional value ("3/4") is multiplied to each element of the corresponding block of proximity matrix 204. A similar process is involved in using each of the other elements of proximity matrix 204 to update elements in a corresponding block of proximity matrix 202.

Finally, proximity matrix 202 is used to generate the scalars used in weighted difference image 400. Specifically, each element of proximity matrix 202 corresponds to a particular block of difference pixels in weighed difference image 400 and is used to supply scalars for that block of difference pixels. For example, in a step 406, an element in proximity matrix 202 (having a value of "3") is normalized by dividing it by the its maximum value of ("4"), and the resulting fractional value ("3/4") is multiplied to each difference pixel of the corresponding block of difference image 400. As another example, in a step 408, an element in proximity matrix 202 (having a value of "3/4") is normalized by dividing it by the its maximum value of ("4"), and the resulting fractional value ("3/16") is multiplied to each difference pixel of the corresponding block of difference image 400. Here, only one of the four difference pixels of the corresponding block is a non-zero difference pixel. Thus, the "3/16" scalar is shown as only being multiplied to the one non-zero difference pixel. A similar process is involved in using each of the other elements of proximity matrix 202 to provide scalars for a corresponding block of difference pixels in weighted difference image 400.

The various normalization steps described above involve dividing intermediate values by a maximum possible value of "4." In other embodiments of the invention, such normalization steps may be performed ahead of time, delayed, or deleted altogether, depending of the specifics of the implementation.

Figure 5:
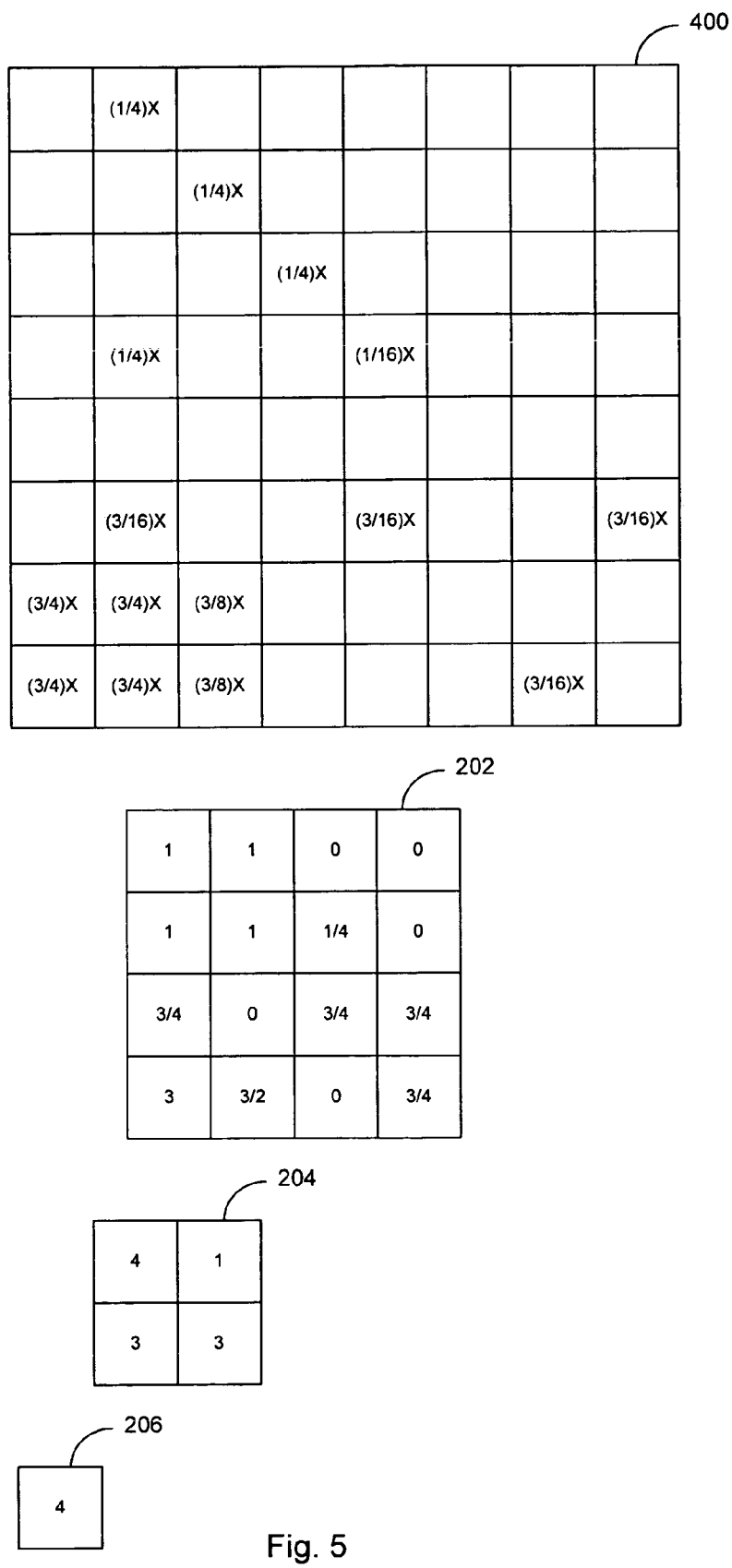
FIG. 5 shows the updated proximity matrices and the weighted difference image resulting from the technique presented in FIG. 4.

FIG. 5 shows the updated proximity matrices 202, 204, and 206 and weighted difference image 400 resulting from the technique presented in FIG. 4.

Edge-Enhanced Difference Image

According to one embodiment of the present invention, computation of differences between images may take into account locality of image differences to edges. For example, if a difference image produced by simply performing a subtraction operation involving a first image and a second image, the difference image may not take into account the proximity of difference pixels to edges within the image. As described in more detail below with respect to FIGS. 6A through 6D, proximity to edges may be utilized to enhance difference pixels located near edges in a difference image, according to one embodiment of the present invention.

Figure 6A:
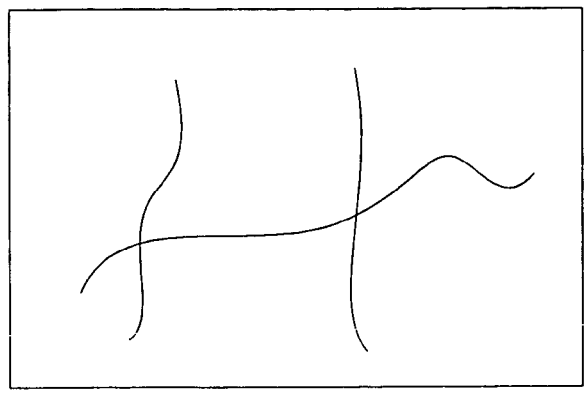
FIG. 6A depicts edge lines indicating the location of edges in an image.

FIG. 6A depicts edge lines indicating the location of edges in an image. The image shown in FIG. 6A may be a two-dimensional image comprised of pixels that have Boolean values. In other words, each pixel may either have a value of "1," indicating presence of an edge, or "0," indicating absence of an edge. Thus, the edge lines shown in FIG. 6A are made up of pixels having values of "1." The rest of image is made up of pixels having values of "0." The thickness of the edge lines shown in the figure may be as thin as one pixel wide. According the present embodiment of the invention, non-uniform weighting may be applied to a difference image representing the difference between a first image and a second image, such that locality of difference pixels in the difference image to edges may be taken into account. For example, difference pixels near edges may be given greater relative weight. To accomplish this, an edge image such as that shown in FIG. 6A may be generated from a source image. For a difference image representing the difference between a first image and a second image, the source image may be the first image, the second image, or a composite of the first and second images. Various techniques may be used to generate the edge image from the source image. For example, a two-dimensional Fourier transform may be taken of the source image, resulting in a transform image. The Fourier transform may be accomplished by taking a fast Fourier transform (FFT) of the image. Then, high-frequency components of the transformed image may be removed. After removing the high-frequency components, the transform image may be transformed back using an inverse Fourier transform to produce the edge image. The inverse Fourier transform may be accomplished by taking an inverse fast Fourier transform (IFFT) of the image. As another example, an edge detection filter may be used to filter the source image and produce the edge image. This may be equivalent to convolving a non-uniformly weighted, two-dimensional function with the source image to produce the edge image. Other techniques for edge detection may also be used, as is known in the art.

Figure 6B:
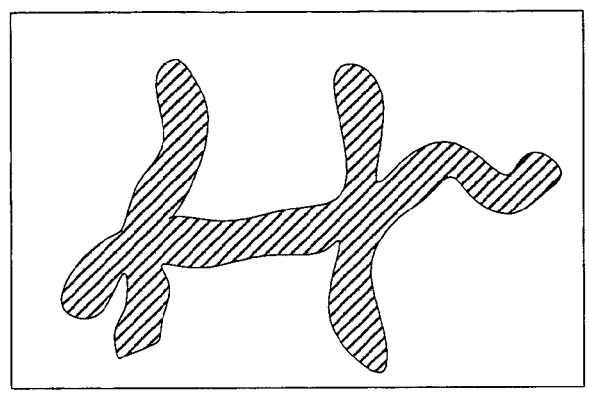
FIG. 6B depicts broadened edge lines generated from the edge lines of FIG. 6A.

FIG. 6B depicts broadened edge lines generated from the edge lines of FIG. 6A. As shown, the thickness of the edge lines has been increased. This may be done by various methods that blur or otherwise broaden the edge lines. For example, an averaging filter may be applied to the edge lines shown in FIG. 6A to produce the broadened edge lines of FIG. 6B. This may be equivalent to convolving a uniformly weighted, two-dimensional function with the edge image. Other methods exists for broadening the edge lines and are well-known to one of ordinary skill in the art.

Figure 6C:
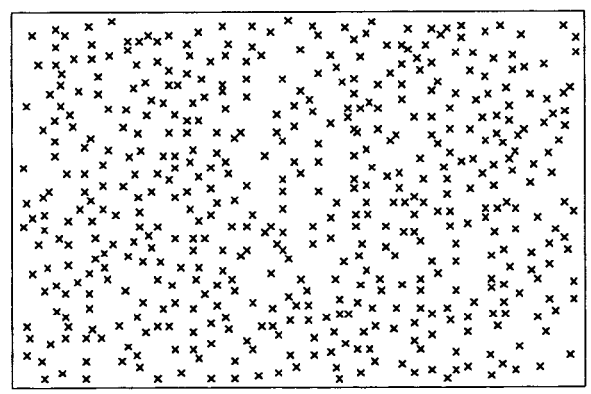
FIG. 6C depicts a difference image that may represent the difference between a first image and a second image.

FIG. 6C depicts a difference image that may represent the difference between a first image and a second image. The difference image comprises difference pixels. Some of the difference pixels have value of zero, and these pixels are not shown in FIG. 6C. Others of the difference pixels have non-zero values, and these pixels are represented in FIG. 6C as the symbols "x." For ease of illustration, the actual value of each non-zero difference pixel is not explicitly show in FIG. 6C. It should be understood that each symbol "x" represents a particular non-zero value of a difference pixel.

Figure 6D:
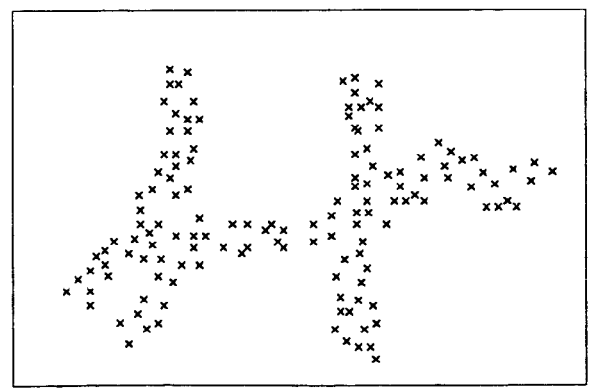
FIG. 6D depicts an edge-enhanced difference image that combines the difference image shown FIG. 6C with the broadened edge lines shown in FIG. 6B.

FIG. 6D depicts an edge-enhanced difference image that combines the difference image shown FIG. 6C with the broadened edge lines shown in FIG. 6B. Here, a weight of "1" is applied to all difference pixels from FIG. 6C that overlap with the broadened edge lines of FIG. 6B. A weight of "0" is applied to all difference pixels from FIG. 6C that do not overlap with the broadened edge lines of FIG. 6B. This is a simplistic example of the application of non-uniform weighting to the difference image. Only two different types of weighting are applied, either "1" or "0." In a more complex embodiment, the broadened edge line shown in FIG. 6B may be made up of more than just Boolean values of "0" and "1." For example, the broadened edge lines shown in FIG. 6B may be represented as values that are greater near the center of the broadened edge lines and smaller near the perimeter of the broadened edge lines. In that case, difference pixels from FIG. 6C that are located closer to the center of the broadened edge lines may be weighted more than difference pixels located closer to the perimeter of the broadened edge lines.

Composite Difference Image

According to one embodiment of the invention, computation of differences between images may take into account both locality of image differences to other image differences and locality of image differences to edges. For example, a composite difference image may be generated that is a composite of three component images: (1) an original difference image ("Orig"); (2) a version of the original difference image that takes into account locality of difference pixels to other difference pixels ("Prox"); and (3) a version of the original difference image that takes into account locality of difference pixels to edges ("Edge"). Further, relative scaling factors may be applied to the three component images:

$$\text{Composite Diff Image} = A^*(\text{Orig}) + B^*(\text{Prox}) + C^*(\text{Edge}) \quad \text{(Eq. 4)}$$

For example, the "Orig" image may be represented by the difference image 200 shown in FIG. 2. The "Prox" image may be represented by the weighted difference image 400 shown in FIG. 4. The "Edge" image may be represented by the edge-enhanced image shown in FIG. 6D. In one embodiment of the invention, the "Orig" image, the "Prox" image, and the "Edge" image are two-dimensional images having identical dimensions, so that the composite image is easily computed. By tuning the relative scaling factors A, B, and C, the contribution of each component image may be controlled. The scaling factors A, B, C can take on different values, including zero. The composite image provides a measure of the difference between two images, taking into account the locality of difference pixels to one another as well as the locality of difference pixels to edges.

EXAMPLE APPLICATION I

Use of Difference Image to Select Anisotropic Filtering Level

The techniques described above for computing difference between images may be utilized in a wide variety of applications. Some of these applications exist in the field of anisotropic filtering. Previously mentioned U.S. patent application Ser. No. 10/936,150, describes anisotropic filtering in further detail, but a brief explanation is also provided below. Anisotropic filtering is a filtering method that is often used to achieve improved texture mapping in graphics processing systems. Texture mapping involves the application of a two-dimensional surface onto a three-dimensional object. This process may be analogized as "wallpapering" or "tiling" the two-dimensional surface onto the three-dimensional object, in order to give the object the appearance of having an outer surface similar to that of the two-dimensional surface. The two-dimensional surface is composed of units commonly referred to as "texels," and the collection of texels making up the two-dimensional surface is of commonly referred to as a texture bitmap. For example, a brick wall can be formed by taking a simple texture bitmap, such as a surface having the appearance of several bricks separated by mortar, and repeatedly tiling that texture bitmap onto a three-dimensional shape of a wall. The texture bitmap and the three-dimensional shape of a wall may be stored in one or more storage units such as system memory 110 and memory 126 shown in FIG. 1.

While a good image of the wall from a "head-on" view can be formed by uniformly sampling the texture bit map to tile the three-dimensional shape of the wall, this simple approach may become problematic when the view changes to an angle or perspective view of the wall. For example, a brick that is perceptively far away is smaller, and thus takes fewer pixels to show, than a close brick. Thus, sampling of the texture bitmap for the far away brick musts be performed differently than sampling of the texture bitmap for the close brick. The process of determining which texels from the texture bitmap are sampled, and how they are used, to map to screen pixels is commonly referred to as "texture sampling and filtering." For example, a simple point sampling routine samples the nearest texel, a bilinear filter samples a two-pixel by two-pixel area (2×2) of the texture and then averages, and a trilinear filter samples a two-pixel by two-pixel area (2×2) on one mip level, a two-pixel by two-pixel area (2×2) on the next mip level, and interpolates between the two values.

Anisotropic filtering is an effective texture sampling and filtering technique for dealing with the problem of angle or perspective views. Anisotropic filtering involves taking more samples along one axis direction (e.g, x-axis), than along another axis direction (e.g., y-axis), in the filtering process. The number of texels sampled to compute each filter output determines the anisotropic filtering level. For example, 1× anisotropic filtering samples 8 texels, 2× anisotropic filtering samples 16 texels, 4× anisotropic filtering samples 32 texels, 8× anisotropic filtering samples 64 texels, 16× anisotropic filtering samples 128 texels, etc. Generally speaking, the higher the anisotropic filtering level, the higher the computational complexity involved in the filtering. Increasing the level of anisotropic filtering may result in a better rendered image, up to a point. That is, for a given texture bitmap, an appropriate level of anisotropic filtering may exist. Applying levels of anisotropic filtering higher than the appropriate level may not significantly improve the rendered image, but can dramatically increase computational complexity. A system that is capable of identifying and performing an appropriate level of anisotropic filtering, instead of performing unnecessarily higher levels of anisotropic filtering, would realize substantial savings in terms of computational complexity and thereby achieve improved performance.

According to an embodiment of the present invention, an appropriate level of anisotropic filtering may be selected by computing the difference between successive levels of anisotropic filtering, and determining whether an increase in the anisotropic filtering level produces a significantly different filtered image. For example, the appropriate level of anisotropic filtering may need to be selected for a particular texture bitmap. 1× anisotropic filtering may be applied to the texture bitmap to generate a 1× anisotropic filtered image. Also, 2× anisotropic filtering may be applied to the texture bitmap to generate a 2× anisotropic filtered image. The difference between the 1× anisotropic filtered image and the 2× anisotropic filtered image can be found by computing, say, their composite difference image as defined in Eq. 4. Using the composite difference image, a determination is made as to whether the 1× anisotropic filtered image is sufficiently different from the 2× anisotropic filtered image. For instance, the two filtered images may be deemed sufficiently different if the sum of all the pixel values of the composite difference image is above a certain threshold. If the 1× anisotropic filtered image is not sufficiently different from the 2× anisotropic filtered image, then it may be concluded that 2× anisotropic filtering is not useful because it does not provide a significant improvement over 1× anisotropic filtering. In this case, the appropriate level of anisotropic filtering for the texture bitmap may be set at 1×. On the other hand, if the 1× anisotropic filtered image is sufficiently different from the 2× anisotropic filtered image, then it may be concluded that 2× anisotropic filtering is useful, and perhaps higher levels of anisotropic filtering may also be useful. In that case, 4× anisotropic filtering is applied to the test image to generated a 4× anisotropic filtered image. Then, the difference between the 2× anisotropic filtered image and the 4× anisotropic filtered image is found, and similar steps are carried out to determine whether 2× anisotropic filtering is useful, and so on. This process may be continued until the appropriate level of anisotropic filtering is found for the texture bitmap. The steps of applying anisotropic filtering, computing the difference between successive levels of anisotropic filtering, and selecting an appropriate anisotropic filtering level may be performed by a processing unit such as CPU 104, GPU 124, or other equipment capable of processing tasks. The various anisotropic filtered images may be stored in one or more storage units such as system memory 110 and memory 126.

While the appropriate level of isotropic filtering for an image can be found by computing differences between successive levels of anisotropic filtering, as described above, this process may be too computationally intensive in certain situations. For example, available computing resources may not be fast enough to compute differences between successive levels of anisotropic filtering for each texture bitmap, perform the required anisotropic filtering, and perform other image functions, for a large number of images to be rendered in a relatively short period of time. As another example, the available GPU used to test different levels of isotropic filtering in the manner described above may not be capable of performing certain levels, such as the maximum level, of available anisotropic filtering. Thus, in other embodiments of the present invention, the appropriate level of anisotropic filtering may be selected by alternative means.

EXAMPLE APPLICATION II

Use of Difference Image to Tune Fourier-Transform-Based Selection of Anisotropic Filtering Level Previously mentioned U.S. patent application Ser. No. 10/936,150, also describes techniques for selecting an appropriate level of anisotropic filtering by utilizing a Fourier transform. Such a Fourier-transform-based technique may require significantly less computational resources, in comparison to a technique based on computation of differences between successive anisotropic filtering levels. To select an anisotropic filtering level for an image (which may be a texture bitmap), the image may first be transformed into frequency space representation by taking a Fourier transform, which can be accomplished by using a fast Fourier transform (FFT). Tne level of anisotropic filtering is selected according to an evaluation of where the transformed image is distributed in the frequency space representation. The principles of this technique are based on the recognition that an image that transforms with many low frequency values (a slowly changing image) likely requires a relatively low anisotropic filter level while one with many high frequency components (a fast changing image) likely requires a high anisotropic filtering level.

Figure 7:
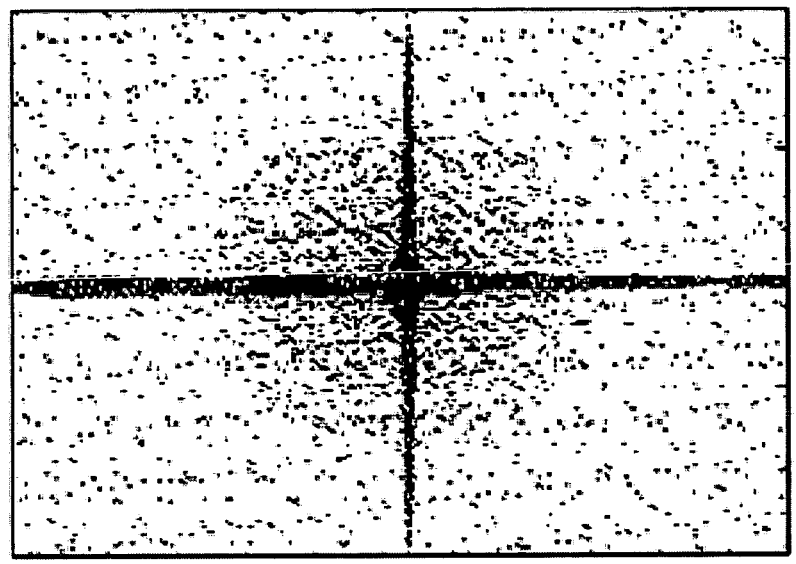
FIG. 7 is a conceptual illustration of a normalized, fast Fourier transform mapping of an image to be filtered.

FIG. 7 is a conceptual illustration of a normalized, fast Fourier transform mapping of an image to be filtered. Normalization produces a Fourier transform mapping such that the Fourier components range between DC at the center while the high frequency components are away from the center.

Figure 8:
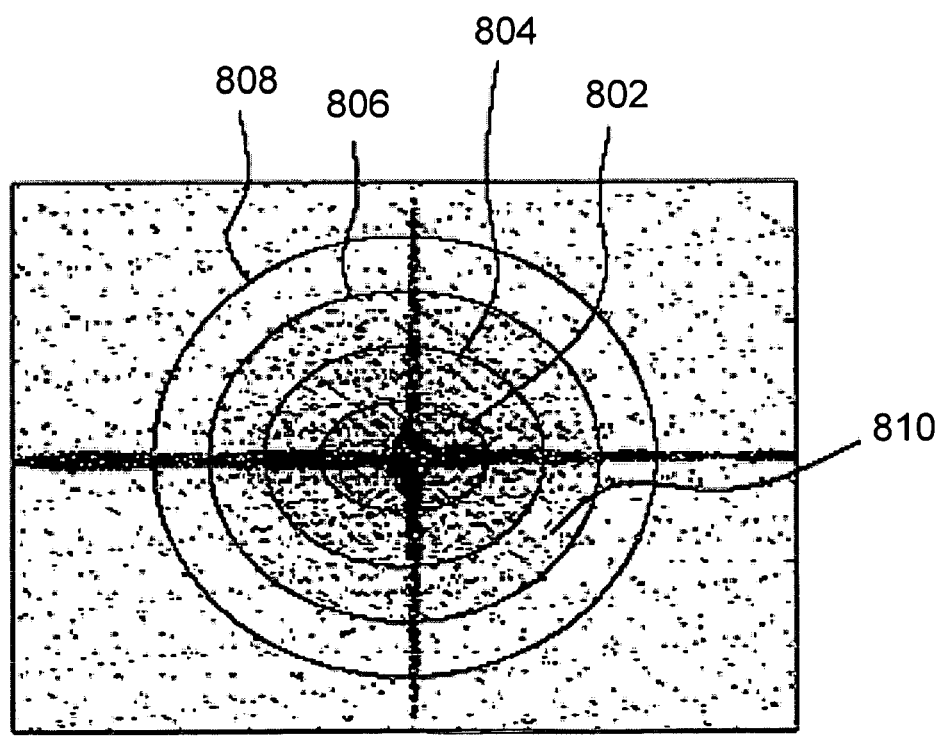
FIG. 8 presents division of the transformed image shown in FIG. 4 using concentric areas referred to as Fourier buckets.

FIG. 8 presents division of the transformed image shown in FIG. 4 using concentric areas referred to as Fourier buckets. The center of the image represents DC component (indicating that areas of the image prior to Fourier transform contains areas having a constant value) and the Fourier transformed components close to the center represent slowly changing areas of the pre-transform image. The center bucket is defined by conceptual line 802. Outside of the conceptual line 802 is another area defined by the area between lines 804 and 802. This represents the second Fourier bucket, and it contains relatively low frequency Fourier transformed components. This corresponds to areas of the image that do not change very quickly, but more so than the Fourier transformed components within the first Fourier bucket. Outside of line 804 is a line 806 which defines a Fourier bucket between lines 806 and 804. This general process continues until the only Fourier transformed components that are not contained within a conceptual line are beyond a line 808. Those Fourier transformed components represent the highest frequency components of the pre-transform image. Those Fourier transformed components are placed in the last Fourier bucket. Every image component in the normalized fast Fourier transformed version is placed within one of the Fourier buckets.

A predetermined normalized Fourier value may act as a Fourier bucket identifier. For example, say 0.7 is the predetermined normalized value. The 0.7 value relates to 70% of the magnitude of the Fourier component values. There is going to be a fast Fourier transformed image point which is closest to, but does not exceed, the 70th magnitude percentile starting from the center of the normalized FFT data set. That image point, for example image point 810, is located within one of the Fourier buckets, in this case within the third Fourier bucket. That third bucket is used to set the anisotropic filter level. For example, each Fourier bucket may correspond to a particular level of anisotropic filtering. If the 70% image point falls in the nth bucket, the level of anisotropic filtering corresponding to the nth bucket may be selected.

According to an embodiment of the present invention, a Fourier-transform-based technique for selecting an appropriate level of anisotropic filtering may be tuned, using results of a more computationally intensive technique for selecting an appropriate anisotropic filtering level by computing the difference between successive levels of anisotropic filtering. In one example, the Fourier-transform-based technique uses Fourier buckets that are fixed, and the technique is tuned by simply adjusting the Fourier bucket identifier value (e.g., 0.7). For instance, if the location of the 3rd Fourier bucket is fixed, and it has already been determined that the 3rd Fourier bucket corresponds to 4× anisotropic filtering, the Fourier identifier value can be adjusted such that images for which 4× anisotropic filtering is appropriate would fall within the 3rd Fourier bucket.

Such an adjustment may be accomplished in the following manner. It may be determined that for each one of a collection of texture bitmaps (used as test images), the appropriate anisotropic filtering level is 4×. This may be done by applying the technique for selecting anisotropic filtering level by computing the difference between successive levels of anisotropic filtering, for each of the texture bitmaps in the collection. Then, for each of these texture bitmaps, a Fourier transform is taken to produce a normalized, transformed image. This generates a collection of transformed images. Here, the 3rd Fourier bucked is fixed, so the positions of the inner boundary and the outer boundary of the 3rd Fourier bucket are known. For each of the collection of transformed images, the percentage of the magnitude of the Fourier component values that are encircled by the inner boundary of the 3rd Fourier bucket is determined, generating an inner boundary percentage. For each of the collection of transformed images, the percentage of the magnitude of the Fourier component values that are encircled by the outer boundary is determined, generating an inner boundary percentage. Thus, a collection of inner boundary percentages (e.g., 66%, 68%, 69%, and 69%) and outer boundary percentages (e.g., 75%, 75%, 76%, and 78%) are produced. The Fourier identifier may be adjusted to be a mid-point between the inner boundary percentages and the outer boundary percentages. One method for computing such a mid-point may simply involve computing the average mid-point as illustrated in Eq. 5 below. Other methods, such as using a median value can also be used.

$$\text{Mid-point} = \frac{(60\% + 68\% + 69\% + 69\%) + (75\% + 75\% + 76\% + 78\%)}{8} = 72\% \quad \text{(Eq. 5)}$$

By adjusting the Fourier identifier to 72% (or 0.72), the Fourier-transformed-based technique for selecting an appropriate anisotropic filter is tuned such that the collection texel bitmaps tested and known to have anisotropic filtering levels of 4× would likely fall within the 3rd Fourier bucket. Other texture bitmaps that are similar to these tested texel bitmaps would also likely to fall within the 3rd Fourier bucket. This presents one specific example of how a Fourier-transform-based technique for selecting an appropriate level of anisotropic filtering may be tuned, using results of a more computationally intensive technique for selecting an appropriate anisotropic filtering level by computing the difference between successive levels of anisotropic filtering. Other attributes of the Fourier-transform-based technique, such as the location and spacing of the Fourier buckets, may also be adjusted in accordance with various embodiments of the invention.

Figure 9A:
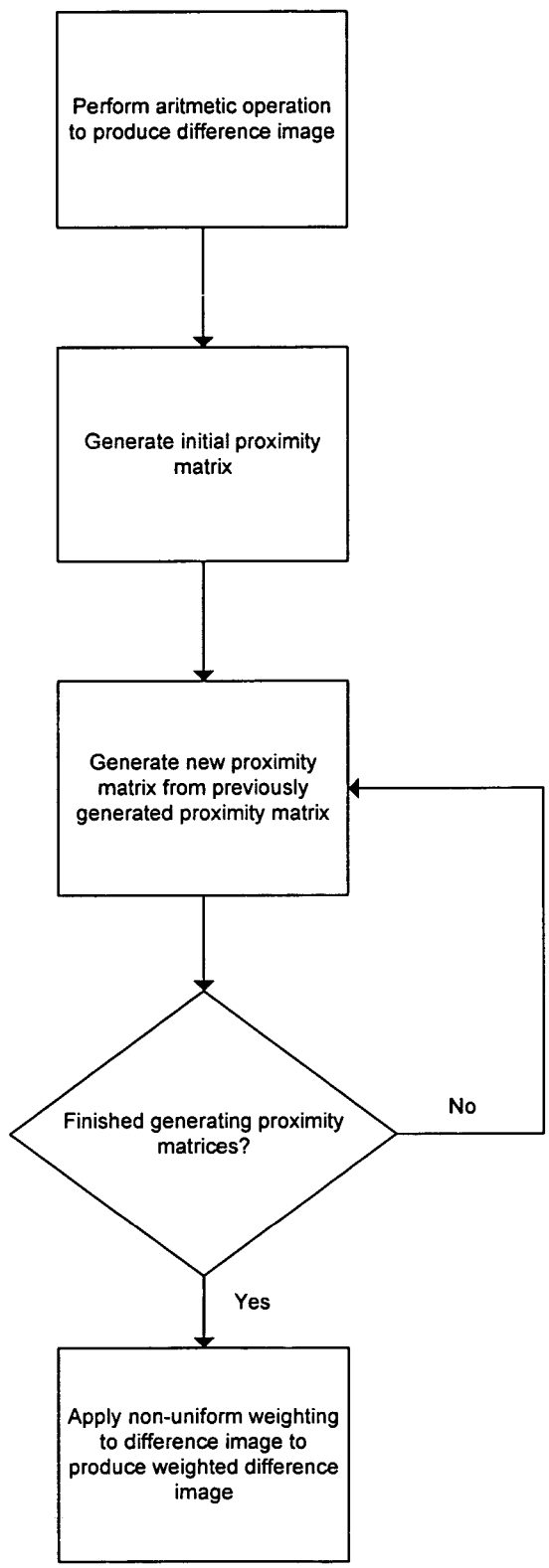
FIG. 9A is a flow chart outlining illustrative steps for obtaining proximity measures and using the proximity measures to apply non-uniform weighting to a difference image to produce a weighted difference image, according to one embodiment of the invention.

FIG. 9A is a flow chart outlining illustrative steps for obtaining proximity measures and using the proximity measures to apply non-uniform weighting to a difference image to produce a weighted difference image, according to one embodiment of the invention.

Figure 9B:
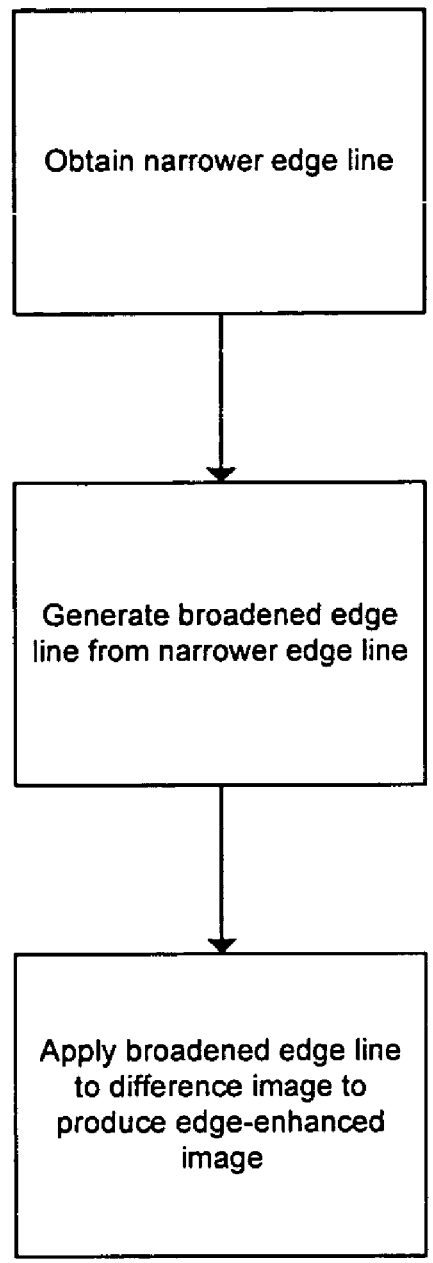
FIG. 9B is a flow chart outlining illustrative steps for producing an edge-enhanced difference image, according to one embodiment of the invention.

FIG. 9B is a flow chart outlining illustrative steps for producing an edge-enhanced difference image, according to one embodiment of the invention.

Figure 9C:
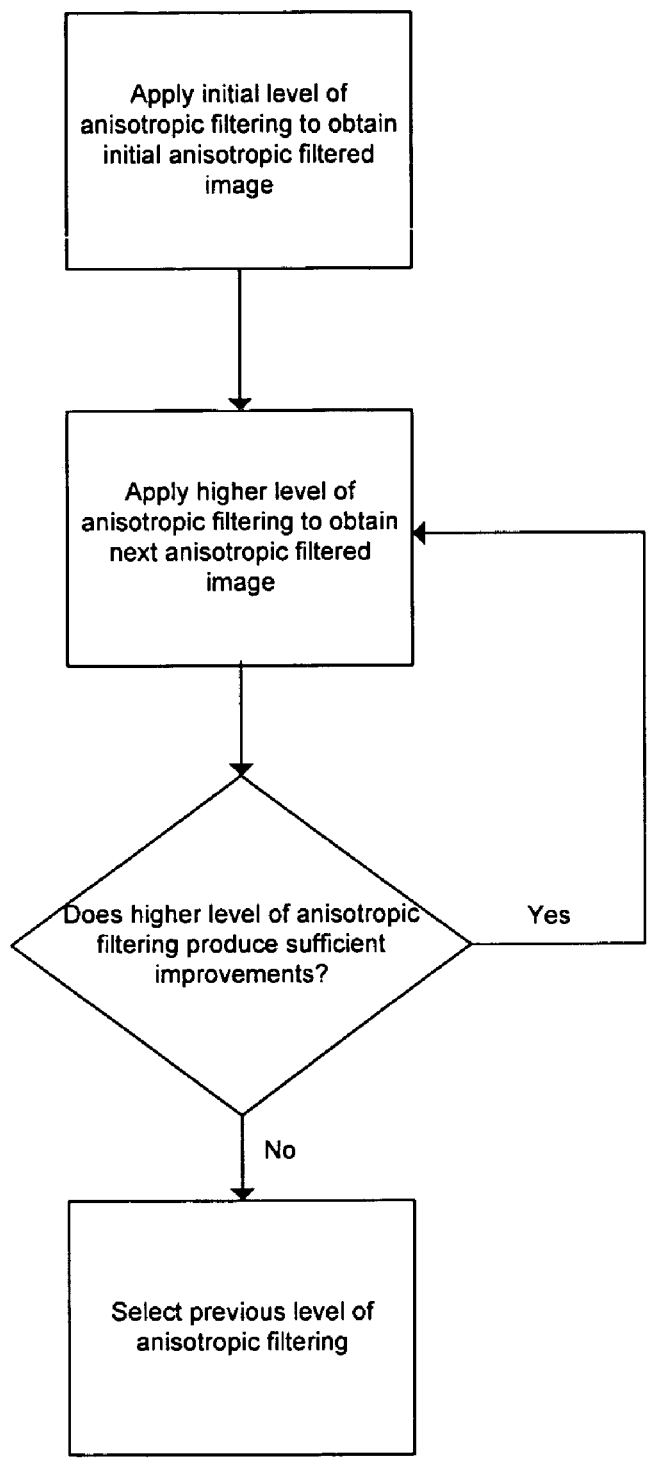
FIG. 9C is a flow chart outlining illustrative steps for selecting an appropriate level of anisotropic filtering by using a difference image, according to one embodiment of the invention.

FIG. 9C is a flow chart outlining illustrative steps for selecting an appropriate level of anisotropic filtering by using a difference image, according to one embodiment of the invention.

Figure 9D:
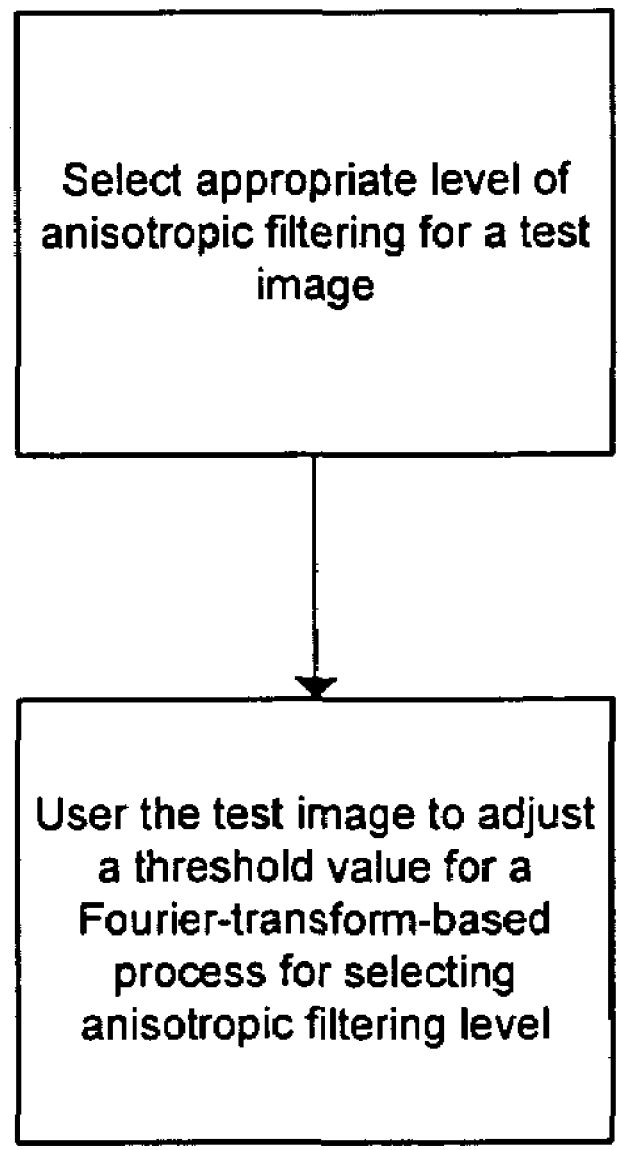
FIG. 9D is a flow chart outlining illustrative steps for tuning a Fourier-transform-based process for selecting anisotropic filtering levels, by using a difference image, according to one embodiment of the invention.

FIG. 9D is a flow chart outlining illustrative steps for tuning a Fourier-transform-based process for selecting anisotropic filtering levels, by using a difference image, according to one embodiment of the invention.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method implemented in a computer system for measuring difference between graphics images comprising:

performing, using a processing unit of the computer system, an arithmetic operation involving a first graphics image comprising a plurality of first pixels and a second graphics image comprising a plurality of second pixels to produce a difference image comprising a plurality of difference pixels;

generating, using the processing unit of the computer system, measures of proximity from a plurality of ranges of observation within the difference image, wherein the measures of proximity represent spatial proximity of difference pixels to other difference pixels within the difference image; and applying, using the processing unit of the computer system, non-uniform weighting to the difference pixels to produce a weighted difference image, wherein the non-uniform weighting depends on the measures of proximity generated from the plurality of ranges of observation.

2. The method of claim 1 wherein the measures of proximity are generated from the plurality of ranges of observation by:

generating an initial proximity matrix using the processing unit of the computer system, each element of the initial proximity matrix corresponding to a group of adjacent difference pixels in the difference image and representing a count of non-zero difference pixels within the group of adjacent difference pixels; and generating a new proximity matrix using the processing unit of the computer system, each element of the new proximity matrix corresponding to a group of adjacent elements in a previously generated proximity matrix and representing a count of non-zero elements within the group of adjacent elements in the previously generated proximity matrix.

3. The method of claim 2 wherein the group of adjacent difference pixels consists of four difference pixels in the difference image, and the group of adjacent elements consists of four elements in the prior proximity matrix.

4. The method of claim 2 wherein the difference image is an N by N image, the initial proximity matrix is an N/2 by N/2 matrix, and the new proximity matrix is smaller than the prior proximity matrix by a factor of two in each dimension, wherein N is a positive integer.

5. The method of claim 1 wherein application of non-uniform weighting to at least one difference pixel involves multiplying measures of proximity generated from different ranges of observation that include the at least one difference pixel.

6. The method of claim 1 further comprising:

obtaining edge information relating to at least one of the first and second graphics images using the processing unit of the computer system; and applying the edge information to the difference pixels to produce an edge-enhanced difference image using the processing unit of the computer system.

7. The method of claim 6 wherein the edge information comprises at least one broadened edge line generated from a narrower edge line.

8. The method of claim 6 further comprising:

combining a scaled version of the difference image, a scaled version of the weighted difference image, and a scaled version of the edge-enhanced difference image to produce a composite difference image using the processing unit of the computer system.

9. The method of claim 8 wherein the composite difference image is used in selecting an appropriate level of anisotropic filtering.

10. The method of claim 9 wherein the first graphic image results from applying a lower level of anisotropic filtering, wherein the second graphic image results from applying a higher level of anisotropic filtering, and the composite difference image is used to determine whether the higher level of anisotropic filtering produces sufficient improvements over the lower level of anisotropic filtering.

11. The method of claim 9 wherein the appropriate level of anisotropic filtering is selected for a test image, and wherein the test image is used to tune a Fourier-transform-based process for selecting an appropriate level of anisotropic filtering.

12. The method of claim 11 wherein the Fourier-transform-based process involves performing a Fourier transform of an image to produce a transformed image, and wherein the Fourier-transform-based process is tuned by adjusting a threshold value used in selecting one of a plurality of Fourier buckets that divide the transformed image.

13. The method of claim 1 wherein the weighted difference image is used in selecting an appropriate level of anisotropic filtering.

14. The method of claim 13 wherein the appropriate level of anisotropic filtering is selected for a test image, and wherein the test image is used to tune a Fourier-transform-based process for selecting an appropriate level of anisotropic filtering.

15. An apparatus for measuring difference between graphics images comprising:

at least one storage unit configured to store a first graphics image comprising a plurality of first pixels and a second graphics image comprising a plurality of second pixels;

at least one processing unit coupled to the at least one storage unit, the at least one processing unit configured to perform an arithmetic operation involving the first graphics image and second graphics image to produce a difference image comprising a plurality of difference pixels;

wherein the at least one processing unit is further configured to generate measures of proximity from a plurality of ranges of observation within the difference image, wherein the measures of proximity represent spatial proximity of difference pixels to other difference pixels within the difference image; and wherein the at least one processing unit is further configured to apply non-uniform weighting to the difference pixels to produce a weighted difference image, wherein the non-uniform weighting depends on the measures of proximity generated from the plurality of ranges of observation.

16. The apparatus of claim 15 wherein the at least one processing unit is configured to generate the measures of proximity from the plurality of ranges of observation by:

generating an initial proximity matrix, each element of the initial proximity matrix corresponding to a group of adjacent difference pixels in the difference image and representing a count of non-zero difference pixels within the group of adjacent difference pixels; and generating a new proximity matrix, each element of the new proximity matrix corresponding to a group of adjacent elements in a previously generated proximity matrix and representing a count of non-zero elements within the group of adjacent elements in the previously generated proximity matrix.

17. The apparatus of claim 15 wherein the at least one processing unit is further configured to:
    obtain edge information relating to at least one of the first and second graphics images; and
    apply the edge information to the difference pixels to produce an edge-enhanced difference image.

18. The apparatus of claim 17 wherein the at least one processing unit is further configured to combine a scaled version of the difference image, a scaled version of the weighted difference image, and a scaled version of the edge-enhanced difference image to produce a composite difference image.

19. The apparatus of claim 18 wherein the at least one processing unit is further configured to use the composite difference image in selecting an appropriate level of anisotropic filtering.

20. The apparatus of claim 19 wherein the appropriate level of anisotropic filtering is selected for a test image, and wherein the at least one processing unit is further configured to use the test image to tune a Fourier-transform-based process for selecting an appropriate level of anisotropic filtering.

21. A system for measuring difference between graphics images comprising:
    means for performing an arithmetic operation involving a first graphics image comprising a plurality of first pixels and a second graphics image comprising a plurality of second pixels to produce a difference image comprising a plurality of difference pixels;
    means for generating measures of proximity from a plurality of ranges of observation within the difference image, wherein the measures of proximity represent spatial proximity of difference pixels to other difference pixels within the difference image; and
    means for applying non-uniform weighting to the difference pixels to produce a weighted difference image, wherein the non-uniform weighting depends on the measures of proximity generated from the plurality of ranges of observation.

22. A computer program product comprising:
    a computer-readable medium having computer program code means embodied therein for measuring difference between graphics images, the computer readable program code means in said computer program product comprising:
    computer readable program code means for performing an arithmetic operation involving a first graphics image comprising a plurality of first pixels and a second graphics image comprising a plurality of second pixels to produce a difference image comprising a plurality of difference pixels;
    computer readable program code means for generating measures of proximity from a plurality of ranges of observation within the difference image, wherein the measures of proximity represent spatial proximity of difference pixels to other difference pixels within the difference image; and
    computer readable program code means for applying non-uniform weighting to the difference pixels to produce a weighted difference image, wherein the non-uniform weighting depends on the measures of proximity generated from the plurality of ranges of observation.

* * * * *